Figure 1A:
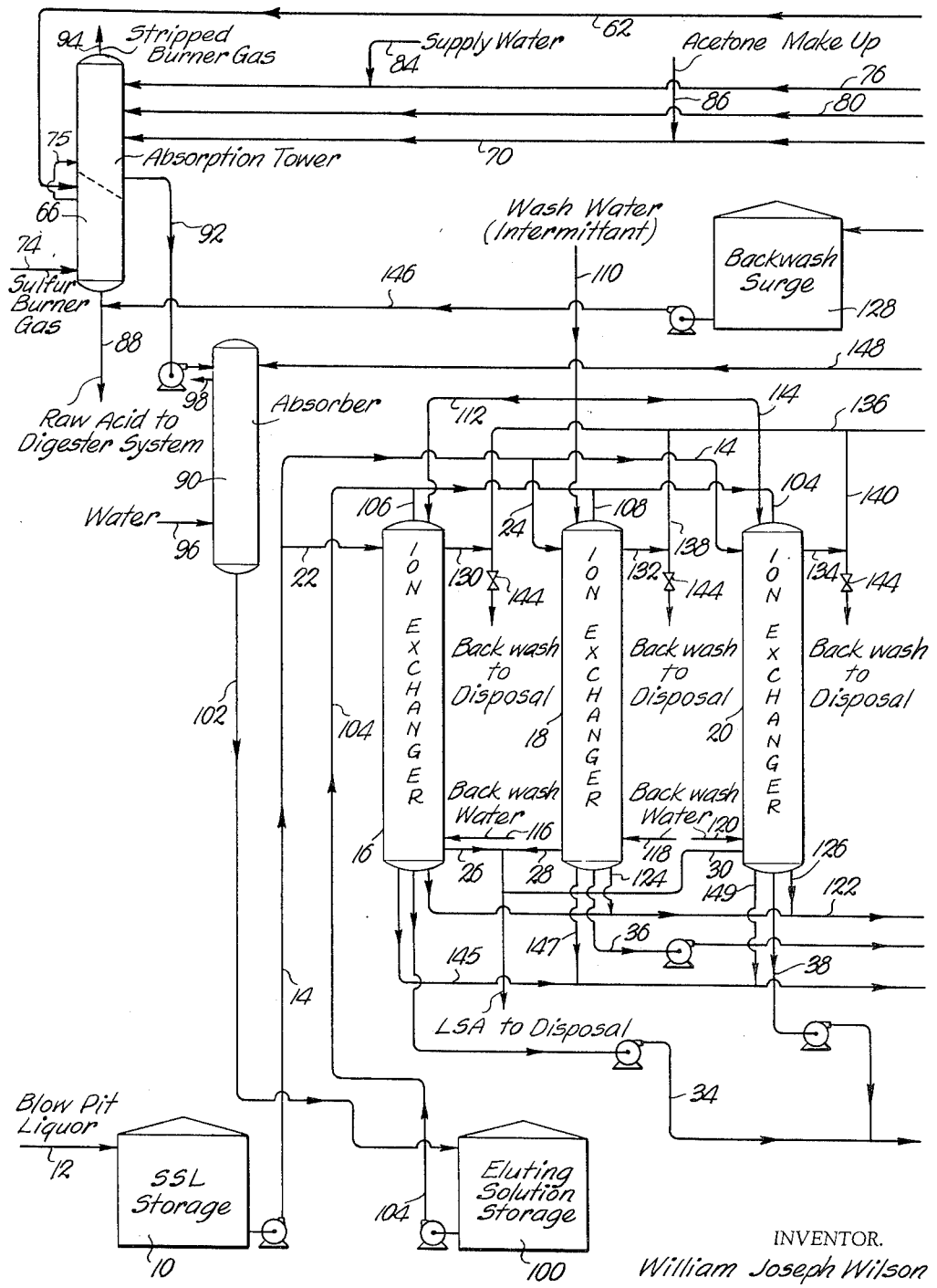

United States Patent Office 3,248,278
Patented Apr. 26, 1966

3,248,278
METHOD OF RECOVERING MONOVALENT CATIONS FROM SPENT MONOVALENT CATION SULFITE PULPING LIQUOR
William Joseph Wilson, Atholville, New Brunswick, Canada, assignor, by mesne assignments, to J. F. Pritchard and Company, Kansas City, Mo., a corporation of Missouri
Filed Aug. 13, 1962, Ser. No. 216,621
Claims priority, application Canada, Feb. 16, 1962, 842,445
11 Claims. (Cl. 162—37)

This invention relates to an ion exchange method of treating the spent sulfite liquor resulting from monovalent cation sulfite pulping of lignin containing fibrous materials to recover the valuable monovalent cations contained in the spent liquor. The process is utilizable for recovery of monovalent cations from monovalent base sulfite spent liquors recovered from the manufacture of wood pulp by either the acid sulfite, bisulfite or neutral sulfite methods.

More particularly, the invention relates to an improved method for displacing both monovalent and multivalent cations from a cation exchange resin onto which the cations have been loaded by passing the spent liquor through the resin, employing an aqueous sulfur dioxide solution as the regenerating medium that may be used at atmospheric pressure and is of much greater effectiveness than prior suitable eluting solutions by virtue of the addition of a material to the sulfurous acid capable of reacting therewith to raise the hydrogen ion concentration of the elutant as well as the total amount of sulfur dioxide which may be maintained in the elutant. Thus, high pressures are not required to maintain the sulfur dioxide in solution. The process also provides a simple and efficient method of separating the monovalent cations from contaminating multivalent cations so that the latter are not returned to the digesters.

For a considerable number of years, the acid calcium bisulfite cooking process has been employed for the pulping of wood. The resulting spent cooking liquors from the pulping process, and containing the bulk of the lignin content of the wood, together with some carbohydrates, was thereafter discarded. More recently, an increasing number of pulp and paper companies have been employing soluble base sulfite pulping liquors, in particular sodium and ammonium base, both of the acid sulfite, bisulfite and neutral sulfite types. The use of monovalent sulfite pulping liquors has important advantages over prior methods because of much shorter expired pulping time, greater variety of species of wood which may be processed and more versatile cooking conditions. Despite these advantages, however, the relatively higher cost of these soluble base pulping liquors has slowed their general acceptance by the industry and considerable work has therefore been directed towards developing economic methods of recovering the monovalent cations such as sodium or ammonium, in a form suitable for reuse in the pulping process. Such monovalent cation recovery processes are rendered even more desirable and attractive from a commercial standpoint, because of the discovery that pulping yield and pulping characteristics are improved, in certain cases, by increasing, to a marked extent, the concentration of the soluble base in the pulping liquor.

In particular, the recovery of ammonia from ammonium lignosulfonate by evaporation and combustion processes and in a form suitable for reuse, is complicated by the comparatively low thermal stability of the gas, and therefore, recovery methods involving combustion of the spent liquor have not been proved to be feasible. The most promising process evolved so far, and one which permits not only the recovery of monovalent and divalent ions from the spent sulfite liquor, but also the separation of multivalent cations from the monovalent cations, consists of absorbing the soluble basic cations on a suitable cation exchange resin and then recovering the monovalent and multivalent cations by displacement of the same from the exchange resin with hydrogen ions using an aqueous solution of sulfur dioxide. Thereafter, the multivalent cations are precipitated out of the elutant in the form of insoluble sulfites leaving a solution containing essentially only monovalent cations. The resulting soluble base sulfite-bisulfite solution may then be used, after suitable fortification with additional quantities of monovalent cations and sulfur dioxide, as fresh pulping liquor.

Although many investigations have been conducted with respect to the recovery of monovalent cations from soluble base spent sulfite liquors by the absorption on ion exchange resins, none of such investigations have heretofore led to a commercial system. Most of these processes were found to be economically unattractive, especially because of the unfavorable equilibrium relationships associated with the use of sulfurous acid solutions for regeneration of the resin beds after loading of the resins with monovalent and multivalent cations from the soluble base spent sulfite liquor. The utilization of sulfurous acid as an elutant limits the efficiency of the process because of the relatively low hydrogen ion concentration of the sulfurous acid solution. The low degree of ionization of sulfurous acid seriously impairs the effectiveness of this material as a regenerant for removing cations from an ion exchange resin and particularly the multivalent cations which are preferentially absorbed and more tenaciously retained on the resins over the various monovalent cations. Another disadvantage is the relatively low solubility of sulfur dioxide in water at atmospheric pressure preventing incorporation and retention of sufficient gas into the liquid to produce a solution having a low enough pH to efficiently remove sodium, potassium or ammonium ions from the strongly acidic exchange resins as well as the various multivalent cations which are more tenaciously retained thereon.

It is also to be noted that in the recovery of pulping chemicals for reuse, the most significant limiting factor is the volume of regenerant which can be used. The volume of regenerant necessarily used in the recovery process must not exceed the volume of pulping liquor that may be reused in the actual pulping of the wood. Thus, in an ion exchange recovery process the feasibility of the method depends upon the amount of regenerating acid which may be employed and reused. For this reason, the amount of elutant passed through the resin beds to displace the desired monovalent cations and the contaminating multivalent cations from the beds, must not exceed the quantity of pulping liquor which is employed in the wood pulping facility. In all cases, the efficiency of sulfurous acid as a regenerant for cation exchange resins is restricted by its low dissociation constant thereby requiring an excessive quantity of the material being passed through the resin beds in order to displace sufficient monovalent and multivalent cations from the resins to make the process feasible from a commercial point of view. Any excess volume of regenerant over that required for the pulping operation would have to be removed by evaporation or expensive reabsorption procedures, or the excess volume discarded thereby resulting in loss of valuable monovalent cations and lowering the efficiency of the recovery process.

It is also to be emphasized that the proposed cation exchange methods for recovering the valuable monovalent cations from the spent sulfite liquor and involving regeneration of the cation exchange resins with sulfurous acid, have not been successful because of the failure of prior workers to make adequate provision for the substantially complete removal of multivalent cations from the spent sulfite liquor flowing from the digesters and which are preferentially absorbed on the ion exchange resin. Thus, the efficiency of the cation exchange resin is decreased by the build-up of multivalent cations to the point where it is necessary to replace such resin or utilize a strongly acidic regenerant such as hydrochloric or sulfuric acid to place the resin in condition for further use in the recovery procedure. The utilization of strong acids makes the process impractical because the over-all cost of operation of the recovery plant is prohibitive.

Although it is well known that wood, commercially supplied water and certain pulping chemicals contain a relatively small percentage of inorganic substances, the effect these compounds have on monovalent cation recovery operations involving cation exchange resins, was not fully appreciated until the development of a cation exchange process as disclosed in Canadian Patent No. 618,158. As explained in such patent, wood of the type normally utilized in pulping operations contains approximately 0.3% by weight of ash and thus in the manufacture of 1 ton of pulp requiring approximately 2 tons of wood, over 12 pounds of ash is introduced into the pulping system and which is composed principally of calcium but contains other multivalent cations such as magnesium, iron and manganese, as well as a small proportion of monovalent cations in the nature of sodium and potassium. The water used for acid making in the manufacture of 1 ton of pulp amounts to approximately 2,000 gallons per ton and, at a median hardness of approximately 100 parts per million, this quantity of water contains about 1.7 pounds of additional inorganic materials, mainly of the multivalent cation type such as magnesium and calcium. Thus, for every ton of pulp produced, approximately 14 pounds of extraneous inorganic substances are introduced into the pulping liquor and it has been found that in a 300 ton per day pulp mill, as much as 1,600 to 3,000 pounds of calcium oxide per day may be introduced into the pulping liquors from the wood and process water used.

The process described in Canadian Patent No. 618,158 involved utilization of at least two resin beds in series relationship wherein the spent sulfite liquor was passed through the first resin to effect interchange of multivalent cations in the spent liquor for monovalent cations on the exchange sites of the cation exchange resin. As used throughout this specification and the claims herein, the term "monovalent" cation is intended to means cations such as sodium, potassium and ammonium and does not include hydrogen ions. The terminology "multivalent" cation is intended to designate all cations except hydrogen or monovalent cations present in spent sulfite liquor or regenerating solutions for the cation exchange resin and thus would comprise magnesium, manganese, calcium, iron and other similar multivalent cations which are found in spent sulfite liquor. When it is intended to refer to hydrogen ions, these ions will be designated by their chemical name and are to be distinguished from the monovalent cations defined above.

In the process of Canadian Patent No. 618,158, the first resin bed is initially in monovalent cation form so that the multivalent cations in the spent sulfite liquor were preferentially interchanged for the monovalent cations on the cation exchange resin. The effluent from the first resin bed was then passed through an ion exchange resin in hydrogen form to cause the monovalent cations in the spent sulfite liquor to be exchanged for hydrogen ions on the second resin bed and thereby producing a lignin sulfonic acid effluent from the second resin bed substantially devoid of monovalent and multivalent cations. Passage of spent sulfite liquor through the first resin bed was continued until multivalent cations commenced to leak from the bed. By the same token, flow of the effluent from the first resin bed through the second resin bed was continued until monovalent cations commenced to leak from the second ion exchange resin. A continuous cyclic process was maintained employing two beds in series relationship, by virtue of the provision of a number of first ion exchange resin beds in conjunction with a plurality of second ion exchange beds maintained in predetermined flow relationship with the first beds.

The commercial feasibility of the process set forth above related to the discovery that a suitably monovalent cation fortified bisulfite solution was operable to displace multivalent cations from the first resin bed which had been loaded with multivalent cations, by monovalent cations in the bisulfite solution thereby placing the first bed in condition for reloading with multivalent cations by passing the spent sulfite liquor therethrough. The suitably fortified monovalent cation bisulfite solution was found to effect displacement of multivalent cations from the first resin bed without affecting the elutant volume from the second resin bed. Therefore, the only volume increase in the elutant from the second resin bed would be that caused by introduction of wash water into the solution. In this manner, the build-up of an excessive amount of elutant is precluded which would upset the balance of liquids in the recovery system and thus the recovered monovalent cation bisulfite solution is maintained substantially at the volume of pulping liquor required in the wood pulping operation. Additionally, the described process was found to be feasible because the multivalent cations could be readily separated from the regenerating solution passed through the multivalent loaded cation exchange resin by the procedure of raising the pH of the elutant sufficiently to effect precipitation of the multivalent cations from the regenerating solution, thereby returning the regenerant to the condition thereof whereby after refortification of the solution with appropriate monovalent cation and $SO_2$, the liquor can be reused as a regenerating medium.

As previously indicated, the two-stage recovery operation set forth above was found to be economically feasible. However, in order to simplify the recovery process and increase the efficiency of recovery, attempts were made to devise a method of recovering useful monovalent cations from spent sulfite liquor without utilizing a pair of ion exchange resin beds in series relationship, with the multivalent cations being absorbed on one of the beds and the valuable monovalent cations being placed on a second resin bed for removal therefrom with sulfurous acid. Efforts were therefore directed toward providing a commercial process of recovering valuable monovalent cations from soluble base spent sulfite liquor utilizing only one ion exchange resin bed and employing sulfurous acid as the regenerating medium for such bed, notwithstanding the loading of both multivalent and monovalent cations onto the resin during passage of the spent sulfite liquor therethrough. The present invention provides a solution to the problem set forth above and in a manner that makes the process more economically attractive not only from the standpoint that the capital cost of the equipment required for the recovery operation is substantially lower than units such as described in the patent referred to above, but also results in a much higher percentage of recovery of valuable monovalent constituents contained in the soluble base spent sulfite liquor.

It is therefore the primary object of the present invention to provide a process for recovery of valuable monovalent cations from spent sulfite pulping liquors by utilization of an ion exchange resin in a cyclic, continuously operable system without accumulation of multivalent cations on the exchange resins which would gradually decrease the capacity of the resin to absorb the useful monovalent cations thereby interfering with the recovery process, and which is operable utilizing sulfurous acid as a regenerating medium for the ion exchange resin thereby resulting in operating advantages since the sulfurous acid is an integral part of the product to be reemployed in the pulping process.

A further important object of the instant invention is to provide an ion exchange method of treating the spent sulfite liquor resulting from monovalent cation sulfite pulping of wood for recovering valuable monovalent cations contained in the spent liquor, wherein sulfurous acid may be utilized as a regenerating medium for providing hydrogen ions to displace monovalent, as well as multivalent cations from the ion exchange resin, by adding a material to the sulfurous acid capable of reacting therewith to raise the hydrogen ion concentration of the solution to a sufficient level to efficiently displace both monovalent and multivalent cations from the resin by hydrogen ions in the sulfurous acid solution and with a practicable amount of the regenerant being passed through the resin for regeneration purposes. In addition, the process makes possible the efficient separation of the monovalent cations from the multivalent cations without increasing the volume of the regenerating solution.

Also an important object of the present invention is to provide a valuable monovalent cation recovery process as defined above wherein the material added to the sulfur dioxide solution and capable of reacting with the sulfurous acid therein to substantially lower the pH of the regenerant, may be readily recovered from the elutant after passage of the regenerant through the ion exchange resin to effect displacement of multivalent and monovalent cations on the exchange resin for hydrogen ions in the regenerating solution, and with the additive being reusable for again lowering the pH of the elutant solution before the same is passed through the exchange resin for elution purposes. In this respect, a further important object of the invention is to provide a recovery operation as set forth wherein the material added to the sulfur dioxide solution to substantially lower the pH thereof by reacting with the sulfurous acid therein, is of a nature that the same is very similar to compounds developed in the pulping operation and which can be utilized to augment the additive so that very little make-up, if any, of the additive is required because of inherent losses in the additive recovery procedure.

Another particularly important object of the invention is to provide a recovery process wherein the additive added to the sulfurous acid solution to decrease the pH of the solution also aids in absorption of the sulfur dioxide gas and permits incorporation of additional quantities of sulfur dioxide into the solution, thereby further lowering the pH of the regenerating medium and permitting practical quantities of the regenerant to be passed through the monovalent and multivalent cation loaded resin to again place the same in hydrogen form for treatment of additional quantities of soluble base spent sulfite liquor.

An important aim of the invention is to provide a valuable monovalent cation process utilizing ion exchange resins wherein the additive introduced into the sulfurous acid solution to lower the pH thereof is relatively inexpensive, is completely compatible with the ion exchange resin, the sulfurous acid solution, and the monovalent cation bisulfite-sulfite solution recovered from the resin and to be reused in the pulping process after suitable fortification thereof. The additive introduced into the sulfurous acid solution to lower the pH thereof and to increase the amount of sulfur dioxide which may be incorporated into the regenerant, is of particular value because the same does not undergo significant extraneous chemical reactions as for example oxidation, condensation and polymerization, under the conditions of use, and it may be economically recovered for reuse in the process.

Other important objects and details of the present method will become obvious or be explained in greater detail as the following specification progresses.

Briefly, the present process contemplates the provision of a plurality of strongly acidic ion exchange resin beds contained in suitable equipment, each of which is initially in hydrogen form so that upon passage of the soluble base spent sulfite liquor therethrough, monovalent and multivalent cations contained in the liquor are exchanged for hydrogen ions on the cation exchange resin. It is to be understood that the spent sulfite liquor is passed through one ion exchange resin while a regenerating solution is being passed through another resin that has previously been loaded with monovalent and multivalent cations from the spent sulfite liquor. The lignin sulfonic acid effluent from the ion exchange resin beds being loaded with monovalent and multivalent cations, is directed to a disposal area or to a valuable constituent recovery plant, with the passage of spent sulfite liquor through the resin being continued until monovalent cations commence to leak from the resin.

Next, a regenerating solution is passed through the loaded resin while the spent sulfite liquor is switched to another ion exchange resin in the hydrogen form so that the cyclic process can be carried out on a continuous basis. The eluting solution for the loaded ion exchange resin comprises a sulfur dioxide solution containing a sufficient quantity of a compound capable of reacting with the sulfurous acid in the solution to substantially lower the pH of the sulfur dioxide solution and to permit incorporation of material additional amounts of sulfur dioxide into the solution than would otherwise be possible without employing a high pressure system. Although both aldehydes and ketones of suitable properties may be added to the sulfurous acid, the preferred method involves addition of a ketone such as acetone to the sulfurous acid and the regenerating solution produced thereby is directed through the ion exchanger to effect interchange of hydrogen ions in the regenerant for valuable monovalent cations and the multivalent cations on the resin sites in the loaded bed. The effluent from the ion exchange resin and which constitutes acid liquor to be processed into raw cooking acid, is directed through a sulfur dioxide stripper to remove sufficient $SO_2$ therefrom to substantially raise the pH of the solution, whereupon the latter is then fortified with a basic substance such as monovalent cations as hydroxides or carbonates to raise the pH of the solution to a point to effect precipitation of the multivalent cations contained in the recovered acid.

After filtering of the solution for removal of the multivalent cations therefrom, the solution is directed through a still to distill the acetone from the solution whereby the final product resulting from the distillation is refortified with $SO_2$ and then directed into the pulping acid storage facility of the wood pulping plant. The acetone recovered from the still is directed into an elutant make-up unit where the acetone is re-mixed with process water and additional quantities of sulfur dioxide to produce a solution suitable for eluting the next ion exchanger which has become loaded with multivalent and monovalent cations from the spent sulfite liquor. The strong acid effluent stripped of $SO_2$ and acetone, upon suitable fortification with $SO_2$ and monovalent cations if required, is then directed to the digester system of the pulping plant for soluble base pulping of wood. The process as outlined has been found to produce approximately 95% recovery of the valuable monovalent cations which are contained in the spent sulfite liquor available to the process after separation from the pulp. It is to be recognized that a varying percentage of the monovalent cations are lost in the pulping operation depending on the blowing and pulp washing procedures following digestion of the wood and there are also certain inherent losses in ammonia base pulping. The amount of monovalent cations recoverable by the process should economically justify the use of soluble base pulping liquors.

The present method hinges on the discovery that certain additives may be introduced into sulfurous acid to lower the pH thereof to a level whereby the modified sulfurous acid solution may be used to regenerate a cation exchange resin loaded with monovalent and multivalent cations from the spent sulfite liquor. It was determined that one of the basic difficulties in obtaining the maximum efficiency of valuable monovalent cation recovery from spent sulfite liquor and employing a single resin bed system lay in the fact that sulfur dioxide solution in water was too weak an acid to satisfactorily elute, at atmospheric pressure and in the limited volume available, an economically significant quantity of the monovalent cations charged onto the cation exchange resin from the spent sulfite liquor. Thus, when some of the sites on the resin after regeneration were occupied by monovalent ions, the next regeneration cycle was rendered much less efficient because of the decrease of available sites for receiving the monovalent cations from the spent sulfite liquor. The problem was further complicated by build-up of multivalent cations on the resin at least to a relatively high level by virtue of the fact that the sulfurous acid was still less capable of completely displacing multivalent ions from the ion exchange resin and therefore, because of the preferential absorption of the multivalent ions on the resin over even the monovalent ions contained in the spent sulfite liquor, it can be appreciated that the efficiency of the column was seriously impaired and rendered the process impractical from a commercial standpoint because of the necessity of periodically using very strong acids to completely clear the resin of multivalent cations and to place the available resin sites in hydrogen form. It was determined that when hydrochloric acid was used as a regenerant for removing ammonium ions from a strongly acid ion exchange resin, approximately 95% of the resin sites could be regenerated whereas with a sulfur dioxide regenerant, only approximately 80% of the ammonium ions could be displaced from the resin. This of course was under conditions where only ammonium ions were placed on the resin, and did not take into account the difficulty of displacing the more tenaciously held multivalent ions from the resin with the $SO_2$ solution. The efficiency of the process would be materially decreased, especially during cyclic operation, by virtue of build-up of the multivalent ions on the resin sites and which would not be removed by the sulfurous acid. The capacity of the resin bed for spent sulfite liquor was thereby reduced thus further decreasing the sulfurous acid volume available for elution and reducing the efficiency of the recovery process with succeeding cycles.

A sulfurous acid regenerant capable of displacing both monovalent and multivalent ions from an ion exchange resin was developed by adding a material to the sulfurous acid capable of reacting therewith to substantially lower the pH of the regenerant solution and to also permit incorporation of additional quantities of sulfur dioxide thereinto. The additive for the sulfurous acid is preferably a carbonyl compound which will react with the sulfurous acid in the solution to form substances commonly believed to be alpha hydroxy sulfonic acids thereby materially lowering the pH of the regenerant. Certain aldehydes and ketones form bisulfite compounds when combined with sulfuorous acid and which are very strong acids in the nature of alpha hydroxy sulfonic acids. These compounds are somewhat unstable and dissociate reasonably readily to give the original components. The alpha hydroxy sulfonic acids are not volatile in themselves and are readily soluble in water from which they cannot readily be removed except by precipitation in the form of insoluble salts. However, the reactants, that is, the aldehydes or the ketones as well as sulfur dioxide from the sulfurous acid, are readily removed from the aqueous solution thereof either by extraction with nonaqueous solvents or by distillation of the solution. The method employed to remove the additive or $SO_2$ from the sulfurous acid solution will depend upon the particular properties of the aldehyde or ketone component in the mixture. The equation for the reaction is as follows:

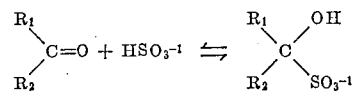

when $R_1$ = organic radical such as methyl, etc.
and $R_2$ = methyl radical or hydrogen.

Thus, it is preferred that the additive be an aldehyde or a ketone of the type that by reaction will form an alpha hydroxy sulfonic acid because the resultant addition product obtained by reaction with the sulfurous acid can readily be dissociated into its component compounds. Examples of operable aldehyde and ketone additives for lowering the pH of the sulfurous acid regenerant include benzaldehyde, iso-butyraldehyde, cyclohexanone, furfuraldehyde, methyl ethyl ketone, methyl iso-butyl ketone, mesityl oxide, salicylaldehyde, formaldehyde, acetaldehyde and the acetone referred to previously. It is obvious that other carbonyl compounds will also be operable for the intended purpose, subject, however to the requirement that there be no steric effects or other special characteristics of the particular compounds which will prevent their giving a reaction product which can be readily converted to the original components and producing a water soluble sulfonic acid. Furthermore, the cost of the additive should not be prohibitive and the additive should be readily recoverable for reuse.

The quantity of additive such as acetone added to the sulfurous acid solution may be varied as required to give a regenerant with a sufficiently low pH to effectively displace monovalent and multivalent ions from the cation exchange resin. It normally is advisable to add sufficient additive to lower the pH of the regenerant to approximately 0.0 or to even obtain a negative pH. With the preferred additive, it has been determined that up to 26% by weight of acetone in each liter of the regenerant solution can be used if the sulfur dioxide concentration in the sulfurous acid solution is no more than approximately 14% by weight. This level depends on the temperature of the mixture and thus as the acetone is reduced, the sulfur dioxide concentration may be increased to as high as 25%. The ranges of acetone and $SO_2$ may conveniently be expressed as being from 1% to 26% and 2.5% to 25%, respectively, to give operable results. The lower levels, however, are 0% acetone and approximately 14% sulfur dioxide. It is to be understood that at 0% acetone and atmospheric pressure, the maximum $SO_2$ concentration is 14% with the temperature of the solution lowered to a minimum point. The preferred concentrations are 1.52 molar or about 8% acetone and 2.75 molar or approximately 16% sulfur dioxide in the aqueous solution.

The following examples serve to illustrate the increase in hydrogen ion concentration of sulfurous acid solutions obtained by the addition of various aldehydes and ketones.

*Example 1*

One liter of a solution of sulfur dioxide in water at 10° C. and containing 13% by weight of sulfur dioxide has a hydrogen ion concentration of 0.19 equivalent per liter. On addition of 1.00 mole of iso-butyraldehyde and cooling of the solution to 10° C., the hydrogen ion concentration of the regenerant increases to 0.63 equivalent per liter.

*Example 2*

On addition of 1.00 mole of cyclohexanone to a 1 liter solution containing 13% by weight of sulfur dioxide as set forth in Example 1, and also measured after cooling of the solution to 10° C., the fortified solution has a hydrogen ion concentration of 0.76 equivalent per liter.

*Example 3*

On addition of 1.00 mole of acetone to a 1 liter solution of sulfur dioxide containing 13% by weight of $SO_2$, and after cooling of the solution to 10° C., the hydrogen ion concentration of the solution increases to 0.76 equivalent per liter.

The following examples serve to illustrate the increase in the total sulfur dioxide concentration when solutions containing aldehydes and ketones are saturated with sulfur dioxide gas.

Example 4

A liter of distilled water at 10° C. was found to absorb 137 grams of sulfur dioxide at maximum saturation. A solution of acetone and water containing 0.84 mole of acetone in 1,000 grams of solution was determined to absorb 163 grams of sulfur dioxide at the saturation point.

Example 5

A solution of methyl ethyl ketone and water containing 0.93 mole of methyl ethyl ketone in 1,000 grams of solution was found to absorb 160 grams of sulfur dioxide gas at the saturation point at 10° C.

In accordance with the concepts of the present process, the monovalent and multivalent cations in the spent sulfite liquor are absorbed onto a cation exchange resin of the sulfonic acid type and in place of hydrogen ions initially provided thereon. The monovalent and multivalent cations are then removed from the resins by a regeneration step utilizing sulfurous acid having an additive therein capable of lowering the pH of the solution to a sufficient level to effectively displace both multivalent and monovalent ions from the resin and to leave hydrogen ions thereon. The increase in efficiency of the sulfurous acid regenerant obtained by the addition of a ketone such as acetone is illustrated by the following laboratory experiment.

Example 6

A cation exchanging column was prepared having a diameter of 1 inch and a resin bed height of 24 inches. A strong acid resin of the sulfonic acid type was introduced into the column and which was preferably Dowex 50W X–8 manufactured and distributed by the Dow Chemical Company. The resin bed was conditioned according to standard procedures by alternately cycling 1 normal HCl and 1 normal NaCl solutions through the bed and with intermediate washings with distilled water being employed until the washings gave negative tests for chloride ions. Finally the resin was converted to the hydrogen ion form by passage of excess 1 normal hydrochloric acid through the bed followed by backwashing of the same and continued washing of the bed with distilled water until the resin was free of chloride ions. Throughout the above steps the flow rate of liquid throughout the bed was maintained at 40 to 50 milliliters per minute.

The resin in hydrogen ion form was then charged with ammonium ions by passage of 2 liters of spent sulfite liquor through the column at 25 milliliters per minute flow rate. The spent sulfite liquor contained 9.63 grams of ammonia per liter of solution. Analysis of the effluent from the column showed that 10.65 grams of ammonia were loaded onto the resin beads. After washing the column free from excess spent sulfite liquor, the ammonia was eluted from the column with 1,140 milliliters of sulfur dioxide water solution containing 14.3% $SO_2$ and having a pH of 0.45 at 7° C. Distilled water was then passed through the column until 1,500 milliliters of total effluent had been collected. Analysis of the effluent showed that 7.06 grams or 66.3% of the ammonia on the column had been recovered from the resin by the sulfurous acid regenerant.

The resin column described above was then stripped with excess 1 normal hydrochloric acid, suitably backwashed and washed free of chloride ions with distilled water. Two additional liters of the spent sulfite liquor identical to that above were passed through the column at a flow rate of 25 milliliters per minute and again 10.65 grams of ammonia were loaded on the column. After washing the resin free of spent sulfite liquor, the ammonia was eluted by passage of 1,140 milliliters of an aqueous solution containing 16.8% $SO^2$ and 8% acetone by volume at a temperature of 7° C. through the loaded resin. The eluting solution had a pH of 0.00 and after complete passage of the regenerant through the resin the bed was washed with distilled water until 1,500 milliliters of effluent had been collected. Analysis of the effluent from the regeneration step showed that 9.86 grams or 92.6% of the ammonia on the column had been recovered by the acetone-sulfur dioxide aqueous regenerant. Thus the acetone-sulfur dioxide regenerant was 39.7% more efficient in removing ammonia from the resin bed than the sulfur dioxide water system alone.

Thus it has been shown that the present process permits a more efficient recovery of cations from spent sulfite pulping liquors than has heretofore been achieved by the use of ion exchange resins regenerated with sulfur dioxide solutions. The advantages of recovery of the cation as a bisulfite and which are inherent in the sulfurous acid regeneration of the resin have been retained, and at the same time the recovery has been improved to a marked degree. The process is particularly important in view of the present trend toward the use of pulping liquors containing higher concentrations of soluble base, in which case a more efficient recovery system is necessary in order to recover the greater amount of soluble base with the same limited volume of regenerant.

Figure 1B:
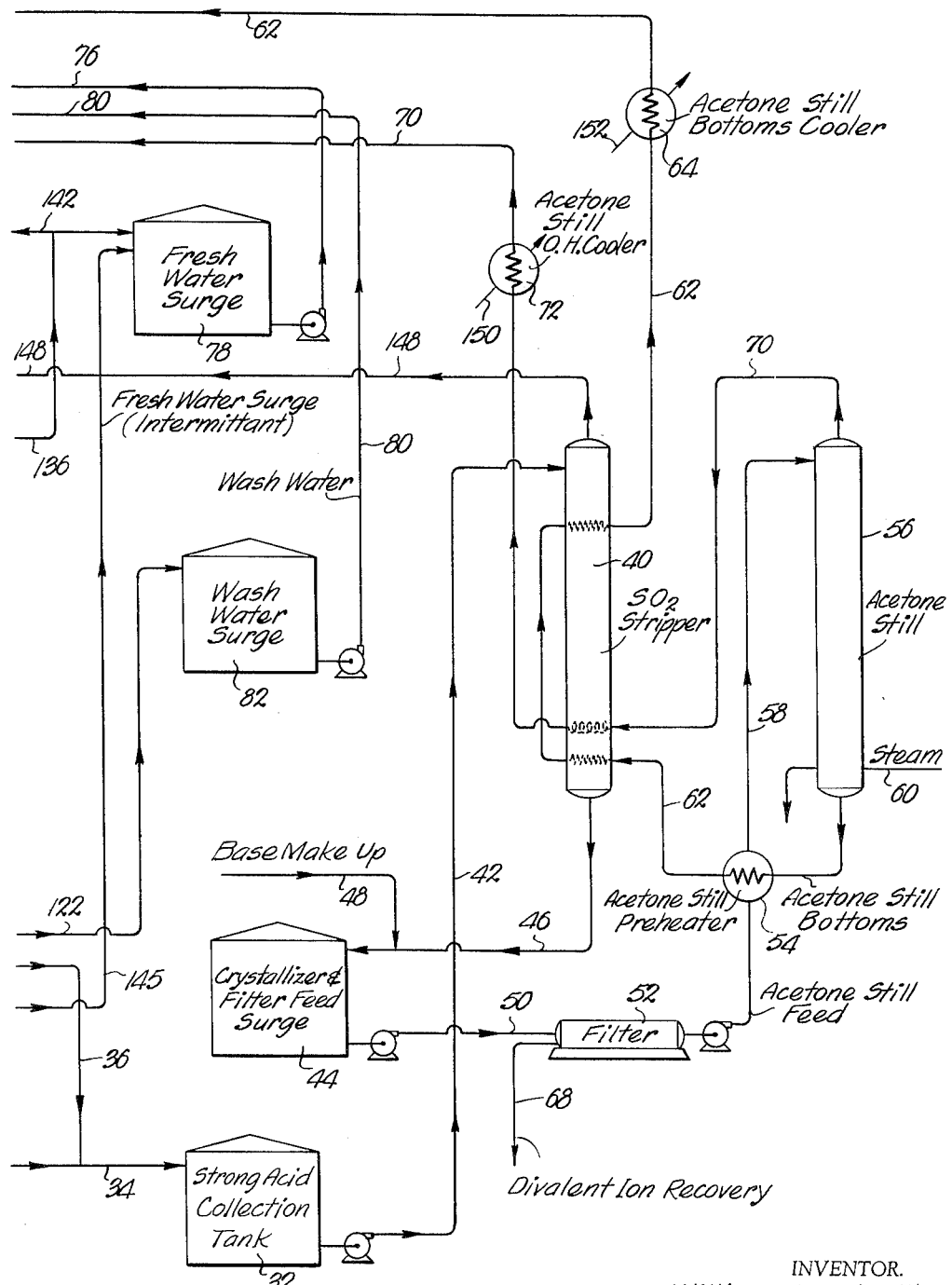

The commercial method of employing the invention is best understood when considering the flow diagram illustrated in FIGS. 1A and 1B of the drawings wherein is shown an ion exchange method of treating the spent sulfite liquor resulting from monovalent cation sulfite pulping of wood for selectively separating valuable monovalent cations from multivalent cations contained in the liquor.

The spent sulfite liquor from the blow pits is directed into the spent sulfite liquor storage tank 10 through line 12 and is pumped from tank 10 via header line 14 to the ion exchange columns 16, 18 and 20, it being noted that by-pass line 22 couples line 14 to the upper end of column 16, while by-pass line 24 joins line 14 to the upper extremity of column 18 and the line 14 leads directly into the upper extremity of column 20. A conduit 26 leading out of the lower end of column 16 directs lignin sulfonic acid to a disposal unit or area while another conduit 28 from the lower end of column 18 and a conduit 30 from the bottom of column 20 also communicate with conduit 26 for directing the lignin sulfonic acid effluent to a point of discharge. A certain portion of the effluent from the columns 16, 18 and 20 is directed into the strong acid effluent collection tank 32 via line 34 coupled to the bottom of column 16, while line 36 from the lower end of column 18 communicates with line 34 and the line 38 leads from the lower end of column 20 into the line 34. From the tank 32, the strong acid is pumped to the top of flash column 40 through line 42 with the effluent from column 40 being directed into surge tank 44 via line 46.

Conduit 48, joined to line 46 between tank 44 and column 40, is coupled to a suitable source of monovalent base such as ammonia for permitting controlled amounts of the latter to be directed into the liquid passing through line 46. The outlet conduit 50 from tank 44 permits liquid to be pumped therefrom through a filter unit 52 with the liquid filtrate from unit 52 being passed through a heat exchanger 54 and into the uppermost end of still 56 via line 58. Steam from a suitable boiler plant is directed into still 56 through line 60 while the still bottoms from still 56 are conveyed through heat exchanger 54 by line 62 into and through the flash column 40 as is apparent from FIG. 1B. It can be seen that the line 62 also goes through another heat exchanger 64 and ultimately is directed into the tower 66 shown in FIG. 1A. The multivalent ions recovered from the liquid passing through filter unit 52 are sent to a recovery plant through line 68. The volatile material recovered from the top of still 56 is directed through column 40 by line 70 communicating with the upper end of still 56 and also with the upper section of a gas absorption tower 66. Line 70 also passes through a heat exchanger 72 located between column 40 and the tower 66.

Sulfur dioxide from a sulfur burner is directed into the lower section of tower 66 through line 74 where the gas is absorbed into the liquid contained within the tower. Line 75 intercommunicates the upper and lower sections of tower 66. Water is introduced into the tower 66 through line 76 leading from the fresh water surge tank 78 into the upper portion of tower 66, as well as through wash water line 80 extending from surge tank 82 into the upper portion of tower 66. As shown in FIG. 1A, additional supply water is directed into line 76 through supply conduit 84 with acetone make-up to line 70 being effected through conduit 86 coupled to a source of supply of the acetone.

Raw cooking acid produced in the absorption tower 66 is directed to the digester system of the pulping plant through line 88 leading out of the lower end of tower 66. A solution containing acetone and absorbed $SO_2$ is directed to the absorber 90 through conduit 92 connecting tower 66 to absorber 90. Stripped sulfur burner gas is removed from the upper end of tower 66 by the line 94 projecting from the upper extremity of tower 66. Water at a relatively low temperature is directed into the absorber 90 through line 96 and withdrawn from the absorber through line 98 so as to lower the temperature of the liquid passing downwardly through the absorber. The regenerant solution emerging from absorber 90 is conveyed to the storage tank 100 via line 102 and the eluting solution is pumped from tank 100 to the upper ends of columns 16, 18 and 20 through the header pipe 104. Conduit 106 joins header pipe 104 to the upper end of column 16 and conduit 108 joins pipe 104 and the upper end of column 18. It is to be noted that pipe 104 runs directly into the upper extremity of column 20.

Wash water from a supply line (not shown) is intermittently directed through the exchange resins in columns 16, 18 and 20 and is supplied to the upper ends of the columns by a line 110 which is coupled to the lines 112 and 114, respectively. Line 110 connects directly with the upper end of column 18 while the feeder lines 112 and 114 are coupled to the upper ends of columns 16 and 20, respectively. Backwash water is also directed to the columns 16, 18 and 20 through the lines 116, 118 and 120, respectively, which are joined to the lower ends of the columns for passage of water upwardly through the exchange resins therein. The initial wash water through the ion exchange resins in columns 16, 18 and 20 is passed to tank 82 through the line 122 joining the lower end of column 16 with tank 82, as well as the lines 124 and 126 which are coupled to the lower ends of columns 18 and 20, respectively, and are joined to line 122. Backwash water from the columns 16, 18 and 20 is directed into either the backwash surge tank 128 or to the fresh water surge tank 78. The lines 130, 132 and 134 connected to upper ends of columns 16, 18 and 20, respectively, are connected to the lines 136, 138 and 140 with line 142, joining tanks 128 and 78, being joined to line 136 while lines 138 and 140 are coupled directly to line 136. As indicated in FIG. 1A, the lines 136, 138 and 140 have valves 144 therein for controlling flow of the backwash water to a disposal unit or area. The fresh water pipe 145 leading out of the lower end of column 16 and coupled to tank 78 also serves as means for effecting return of water from columns 18 and 20 to the tank 78 through the lines 147 and 149 which are joined to line 145 and to the lower extremities of corresponding columns 18 and 20. Line 146 is employed to couple the backwash surge tank 128 with the line 188 leading to the digester system of the pulping plant, and a conduit 148 carries the sulfurous acid and acetone overhead from the top of flash column 40 to the top of absorber 90. It is to be understood that relatively cool water such as is passed through absorber 90 is also directed through the heat exchanger 72 via line 150 and through heat exchanger 64 through the line 152 to cool the solutions conveyed through line 70 and line 62, respectively.

Although not set forth in the schematic representation illustrated in FIGS. 1A and 1B, it is to be understood that the various conduits, pipes and lines are provided with suitable automatically controlled valves therein for regulating flow of fluid through the respective lines into the columns 16, 18 and 20 and for controlling passage of liquid into and through the other processing equipment employed in the recovery procedure. The different valves are controlled in a manner to effect cyclic operation of the monovalent recovery process without operator attention being required other than to ascertain that the process is continuing in a normal manner.

OPERATION

The operation of the apparatus illustrated schematically in FIGS. 1A and 1B in carrying out the method of the present invention will be described with reference to actual volumes, temperatures, components and processing conditions which would be suitable for a 550 ton per day pulping plant employing the ammonium bisulfite pulping process, with 100 pounds of ammonia being employed for each ton of unbleached air dried pulp and using acetone in the base recovery process. It is to be understood that the figures set forth are exemplary only of an operable process for carrying out the present invention and are not intended to be limiting or restrictive in any sense. It is further assumed that the system has been operated a sufficient number of cycles to produce equilibrium conditions in the resin beds with respect to loading and elution thereof.

In a 550 ton pulp mill of the defined specifications, a representative raw cooking acid directed to an acid fortification system via line 88 could contain 0.787% by weight of ammonia and 3.95% by weight of sulfur dioxide with the remaining percentage of the solution comprising a negligible amount of acetone and a major volume of water. Approximately 50,000 gallons per hour of spent sulfite liquor could be directed into the tank 10 through line 12, assuming that the capacity of the plant was of the order of 550 tons per day of pulp. The ammonia content of the spent sulfite liquor also could comprise approximately 1,960 pounds per hour with the liquor having specific gravity of 1.1.

The sulfurous acid-acetone elutant stored in tank 100 in the preferred process thus would contain 16% by weight of sulfur dioxide, 8% by weight of acetone and 76% by weight of water. Therefore, in the illustrative process, 33,520 gallons per hour of the elutant would be required to regenerate the ion exchange resins. The plant should also be capable of delivering 31,800 gallons per hour of raw cooking liquor to the digesters.

It may additionally be assumed that the columns 16, 18 and 20 have a bed void of 640 cubic feet. The strongly acid sulfonic acid resin employed in the columns is preferably loaded with monovalent and multivalent cations from the spent sulfite liquor during a 60 minute loading period and then washed, eluted, washed and backwashed during a 100 minute cycle. Thus, one resin bed is being loaded, another bed is being eluted and the third bed is undergoing a washing and backwashing step during the loading cycle of the first resin bed.

For purposes of the present description it is assumed that column 16 contains backwash water from a prior washing cycle, that the column 18 is in condition for washing and backwashing after elution of the resin therein and that bed 20 is fully loaded with monovalent and multivalent ions and is therefore in condition for elution. A complete cycle of bed 16 will first be described in detail. Spent sulfite liquor at a temperature of approximately 190° F. is directed from tank 10 into the upper end of column 16 through line 14 and the by-pass line 22 at a rate of about 833 gallons per minute to cause approximately 6.3 gallons of the liquor per square foot of resin bed surface to flow through the resin in the column, each minute of the loading cycle. The valves are initially set so that 3,980 gallons of spent sulfite liquor are passed through the resin in column 16 in a time period of about 4.7 minutes to effect displacement of the backwash water therein from column 16 into the wash water surge tank 82 through line 122. Next, the valve in line 122 is closed and the valve in line 26 opened to permit the lignin sulfonic acid effluent from column 16 to pass to the disposal unit or area. Spent sulfite liquor from tank 10 is caused to flow through the ion exchange resin in column 16 for about 55.3 minutes and at the 833 gallons per minute flow rate specified to cause approximately an additional 46,020 gallons of liquor to be pumped from tank 10 and directed into the upper end of column 16. Approximately 50,800 gallons of lignin sulfonic acid and wash water will be directed to the disposal unit or area via line 26 with the 1,862 pounds of ammonia being absorbed on the resin sites of the bed in column 16. It can be assumed, however, that about 98 pounds per hour of ammonia will not be recoverable by the present process and will pass out of the recovery system via line 26. The valve in line 22 is closed and a similar valve in line 24 is opened to permit spent sulfite liquor from tank 10 to be directed into ion exchanger 18. It will be appreciated that the column 18 will have undergone washing and backwashing during the loading period of column 16 and thus is in condition for loading of monovalent and multivalent cations thereon as will be apparent from the description hereinafter.

Referring again to column 16, wash water is directed into the upper end of column 16 from line 110 through line 112 to displace the lignin sulfonic acid contained within the void space therein. Water is permitted to pass into ion exchange column 16 at a rate of about 652 gallons per minute by opening of the valve in line 112 for 7.4 minutes to permit approximately 4,780 gallons of water to flow through the column 16 to effect complete removal of lignin sulfonic acid from the void space in the column. The effluent from the ion exchanger during this operation continues to pass to disposal via line 26. The valve in line 26 is now closed and the valve in line 145 opened to permit the wash water from column 16 to pass into the fresh water surge tank 78. During the time that the valve in line 145 is open, about 2.4 minutes, approximately 1,590 gallons of water are directed into the column 16 at the flow rate defined above with the water displaced from the column passing into the surge tank 78. Next, the valve in line 145 is closed and the valves in lines 106 and 122 are opened for approximately 3.7 minutes to permit elutant from tank 100 to flow into column 16 at a rate of 652 gallons per minute whereby 2,385 gallons of regenerant from tank 100 are directed into the upper end of column 16 through line 104. The elutant from tank 100 is continued to be passed through column 16 after the expiration of the 3.7 minutes defined with the valve in line 122 then being closed and the valve in line 34 opened for 48 minutes so that the effluent from exchanger 16 thereafter flows into the collection tank 32. A total of 31,200 gallons of eluting solution from tank 100 is passed through the exchange resin in column 16 at a flow rate of 652 gallons per minute to cause approximately 4.9 gallons per square foot of resin bed surface per minute of the regenerant to be passed through the resin. The elutant causes monovalent and multivalent ions on the resin sites in the column 16 to be displaced by hydrogen ions in the regenerant so that the resin is returned to hydrogen form and to direct the valuable monovalent cations as well as the multivalent cations removed from the resin to the collection tank 32 in the form of monovalent and multivalent bisulfites. The manner in which the monovalent ions are recovered from the bisulfite solution in tank 32 will be described in detail hereinafter.

After conclusion of the passage of elutant solution through the ion exchange resin in column 16, the bed is again washed and backwashed during a cycle of approximately 40 minutes leaving a time period of about 20 minutes before the resin in bed 16 is again loaded with monovalent and multivalent cations. During the initial washing stage of the washing and backwashing cycle, 7,960 gallons of fresh water from line 110 is directed into the upper end of exchanger 16 at a flow rate of 652 gallons per minute and upon opening of the valve in line 112 for a period of 12.2 minutes. The effluent from the ion exchanger column 16 continues to flow into the collection tank 32 through the line 34 with the valve in line 34 then being closed and the valve in line 122 again being opened for a period of 20.8 minutes so that upon direction of an additional quantity of 13,550 gallons of fresh water into the upper end of column 16 at the 652 gallons per minute flow rate, the effluent from column 16 is permitted to flow into wash water surge tank 82.

Thereafter, the valve in line 122 is closed along with closing of the valve in line 112. Backwashing of the resin in ion exchanger 16 is carried out to classify the resin and remove all foreign materials from the resin beads. Backwash water from line 116 is directed into the column 16 with 800 gallons of water initially being directed into the resin bed in a time period of 1.2 minutes and the water displaced from the upper end of column 16 being conveyed into the backwash surge tank 128 via the open valve in line 130, and line 136 coupled to line 142 leading into tank 128. In alternative piping systems, the water displaced from the upper extremity of column 16 may be directed to a disposal unit or area, or directly to the line 88.

Next, the valve controlling flow of liquid from line 136 into line 142 is altered so as to direct the remaining quantity of water from line 136 into the tank 78. During this final portion of the backwashing operation, water at 652 gallons per minute is passed upwardly through the resin bed for about 4.9 minutes to cause approximately 3,180 gallons of water to be directed into the lower end of ion exchanger 16. Upon conclusion of the backwashing step, it can be appreciated that the resin bed in column 16 is again in condition for loading of monovalent and multivalent cations thereon with the cyclic operation described above being repeated.

During the 60 minute loading cycle of the resin in column 16, the resin in column 18 is being washed and backwashed in a 40 minute cycle so that the same is in condition to be loaded as soon as completion of loading of the resin in column 16 is effected. As previously explained, the valve in line 22 is closed after the 60 minute loading cycle and the valve in line 24 is opened to permit the spent sulfite liquor from tank 10 to flow into the resin in column 18 through line 14 and by-pass line 24. Thereafter, the loading of ion exchanger 18 continues in the same manner as described with respect to column 16. During the loading period of the resin in column 18, the resin in column 20 is undergoing washing and backwashing while the resin in column 16 is being washed and eluted with the regenerant from storage tank 100.

The time cycles and quantities of liquids passed through the resin beds in columns 20 and 18 are identical with that described in detail above with reference to a complete cycle of operation of column 16. Upon conclusion of the loading of the resin in ion exchange column 18, the resin in column 20 is in condition for loading and the spent sulfite liquor from tank 10 is switched from column 18 to column 20 upon closing of the valve in line 24 and opening of the valve in line 14 at the upper end of column 20. During loading of column 20, the ion exchange resin in column 18 is passed through a regeneration cycle while the resin in column 16 is reclassified and backwashed as set forth. In this manner, the operation is substantially continuous and with 95% of the monovalent cations being removed from the spent sulfite liquor prior to the lignin sulfonic acid being directed to disposal via line 26.

Production of raw cooking acid from the eluting solution collected in tank 32 requires removal of excess sulfur dioxide and acetone and preferably of multivalent ions from the solution.

The liquid from collection tank 32 is initially pumped to the upper end of stripper 40 through line 42 whereby all of the sulfur dioxide not required to maintain the sulfur dioxide stripper bottoms composition is flashed from the solution. By virtue of the inherent losses of ammonia in the digestion operation and the blowing and pulp washing procedures, as well as the small percentage of ammonia which passes to disposal with the lignin sulfonic acid, a certain quantity of make-up ammonia must be added to the acid collected in tank 32 prior to transfer of the same to the tower 66 for addition of sulfur dioxide to the solution for passage to the raw cooking acid of the digester system. Inasmuch as raising the pH of the acid in tank 32 to approximately 6 to 7 effects precipitation of the multivalent ions contained in the solution and in the form of insoluble sulfites, it can be seen that the make-up ammonia added to the solution may be employed to raise the pH of the acid in tank 32. Initially, the pH of the acid in tank 32 is raised to approximately 4 to 5 by flashing off a considerable portion of the excess sulfur dioxide therein, and then the additional ammonia added to the solution through conduit 48 brings the pH of the solution up to 6 to 7, thereby precipitating the multivalent ions.

Again referring to the schematic representation of a process as shown in FIGS. 1A and 1B, and assuming the flow rates previously discussed, an exemplary procedure would involve directing the acid from tank 32 into the upper end of column 40 through line 42 and with the liquor being introduced into stripper 40 at a temperature of approximately 80° F. Acid from tank 32 is delivered to the stripper 40 at a rate to cause 353,962 pounds per hour of the solution to flow through the line 42. This solution will contain about 1,862 pounds per hour of ammonia, 49,035 pounds per hour of sulfur dioxide 24,616 pounds per hour of acetone and 278,449 pounds per hour of water. The liquid from tank 32 is passed in heat exchange relationship to hot fluids from lines 62 and 70 passing into column 40 whereby the temperature of the acid from tank 32 is raised to 130° F. The pressure within stripper 40 is reduced to approximately 5 p.s.i.g. to strip $SO_2$ from the acid at the rate of 42,553 pounds per hour under the conditions specified, via conduit 148. A small amount of acetone will also be flashed from the solution with the sulfur dioxide and of the order of approximately 425 pounds of acetone per hour.

The sulfur dioxide stripper bottoms from column 40 are then directed into the surge tank 44 but it is to be noted that 428 pounds per hour of ammonia are introduced into the feed liquor through line 48. The pH of the solution passing from column 40 will be approximately 4 whereas upon fortification of the acid with additional make-up ammonia, the pH of the liquid is raised to 6 to 7 thereby effecting precipitation of the multivalent cations in the solution as water insoluble multivalent sulfites.

The solution containing the precipitates therein is pumped from surge tank 44 at a rate of approximately 625 gallons per minute and directed through the filter 52 before passing into the preheater 54 and thence into the upper end of the still 56. Approximately 110 pounds per hour of multivalent ions along with 176 pounds per hour of sulfur dioxide, 21 pounds per hour of acetone and 150 pounds per hour of water are removed from the filter 52 through the line 68 with the precipitate being passed to a suitable recovery plant or directed to the waste area associated with the pulping plant. After passage through the filter 52, the solution will be at a temperature of approximately 125° F. and is pumped into the upper end of the still 56 at the defined flow rate of 625 gallons per minute. By passing the solution in line 58 through the preheater 54, the temperature of the acid is raised to 195° F. by virtue of the fact that the solution from the bottom of the still is at a temperature of 230° F. and which is directed via line 62 into the stripper 40. In order to raise the temperature of the solution in still 56 from 195° F. to 230° F. steam at 250° F. and under a pressure of 15 p.s.i.g. is directed into still 56 through the steam line 60. The acetone still bottoms from still 56, after passage through the preheater 54, are reduced to a temperature of 150° F. and then passed into the $SO_2$ stripper 40 for raising the temperature of the acid from tank 32 as previously discussed. Thus, the actone still bottoms passing from the lower portion of stripper 40 are lowered to a temperature of 135° F. and then reintroduced into the upper end of the stipper for thermal interchange with the liquor from tank 32 whereby the still bottoms are again lowered in temperature to about 100° F. The stream emanating from column 40 and passing through line 62 is directed through cooler 64 to bring the liquid into thermal interchange relationship with water directed through line 152. The water enters the cooler 64 at 85° F., thereby lowering the temperature of the stream in line 64 to 90° F. whereby the water passing out of cooler 64 is at a temperature of approximately 95° F. The effluent from cooler 64 directed into tower 66 through line 62 is thereby at a temperature of 90° F. at the time of passage into the tower for absorption of sulfur dioxide thereinto.

Returning to the still 56, sufficient heat is introduced into the recovered acid directed into the still to raise the temperature of the liquor to the specified level of 230° F. whereby the acetone distilled from the solution leaves the still 56 through the line 70 at approximately 200° F. Thus 24,151 pounds per hour of acetone is removed from the solution, leaving less than 19 pounds per hour of actone in the still bottoms passing out of still 56 through line 62. The still overhead passing out of still 56 through line 70 is comprised of 24 pounds per hour of sulfur dioxide and 6,130 pounds per hour of water in addition to the acetone content and which is directed through the column 40 for raising the temperature of the recovered acid directed into the stripper 40 via line 42. The solution directed into stripper 40 through line 70 is lowered from the 200° F. level to about 135° F. before passing into the overhead cooler 72 which is also designed to receive water at 85° F. through the line 150. Thus, the liquid passing into cooler 72 through line 70 is lowered in temperature to about 90° F. with the water effluent from the cooler being at about 120° F. The acetone still overhead solution is then directed into the tower 66 through line 70 for absorption of sulfur burner gas into the same.

The sulfur dioxide stripper overhead from stripper 40 is directed via conduit 148 into the absorber 90. In the illustrative example set forth herein, the stripper overhead in conduit 148 would direct 42,553 pounds per hour of $SO_2$ into absorber 90 along with 425 pounds per hour of acetone and 353 pounds per hour of water.

In order to provide the necessary cooking liquor for the digesters, as well as the elutant solutions stored in tank 100, the water and chemical balance of the system requires that make-up water be introduced into the line 76 for passage into the tower 66. The present system as described requires that 18,636 pounds per hour of make-up water be directed into the line 76 and which is mixed with 39,780 pounds per hour of water pumped from surge tank 78 into the tower 66. Furthermore, acetone is also introduced into the line 70 to make up for the small loss of acetone occuring in the recovery operation and with the present procedure calling for 40 pounds per hour of acetone to be added into the solution in line 70, which is pumped as actone overhead from still 56 at a rate of 340 gallons per minute. The solution from tank 82 may be rated at 167,615 pounds per hour of water, 205 pounds per hour of sulfur dioxide and 4 pounds per hour of acetone.

The supply of burner gas should be capable of furnishing 11,676 pounds per hour of sulfur dioxide delivered into tower 66 and 6,630 pounds per hour of water is introduced into line 88 from the backwash surge tank 128 via line 146.

The elutant solution for tank 100 is provided by directing acid from tower 66 through line 92 into the absorber 90 with 530 gallons per minute of solution being pumped into absorber 90 and thereby furnishing 6,687 pounds per hour of sulfur dioxide, 24,195 pounds per hour of acetone and 233,551 pounds per hour of water. In order to provide proper adsorption of the sulfur dioxide and the acetone into the water, the solution introduced into absorber 90 from tower 66 is cooled by directing water into the absorber through line 96 and at a temperature to lower the elutant solution in the absorber to approximately 62° F. as the same passes from absorber 90 and is directed into tank 100 through line 102.

Although some acetone is lost from the system through the inherent loss as described above, it is to be pointed out that the amount of make-up acetone is maintained at a relatively low level by virtue of the fact that the acid collected in tank 32 contains other carbonyl compounds than acetone received from the digester equipment for pulping of the wood. The exact nature of these carbonyl compounds is not definitely known, but it has been established that a significant quantity of methyl ethyl ketone is obtained from the digester equipment during the pulping step and therefore minimizing the amount of carbonyl compound lost during the monovalent recovery process. Tests have also shown that in addition to the methyl ethyl ketone, furfural may be present adding to the carbonyl materials received from the digesters.

The step of flashing off a considerable portion of the sulfur dioxide in the stripper 40 prior to passage of the solution to the acetone still 56 has also been found to be an important step in the over-all recovery operation, by virtue of the fact that removal of $SO_2$ from the solution materially decreases the quantity of recovered acid which must be distilled in order to remove 99.9% of the acetone from the solution. Maintenance of the volume of liquid required to be distilled at a minimum increases the commercial practicability of the process by virtue of lowering the amount of steam required to be introduced into the still through the steam line 60. It is apparent, of course, that operation of the process must be at a lower cost considering the value of the recovered monovalent ions, as contrasted with the cost of the monovalent ions when purchased to replenish the monovalent ions introduced into the sulfur dioxide solution to produce the monovalent bisulfite cooking liquor of the properties previously defined.

It should also be made clear that resins other than the one stipulated in the exemplary process above may be employed in the columns 16, 18 and 20. Although the polystyrene nuclear sulfonic acid resins such as Dowex 50W X-8 give the preferred results, other resins of this general type may also be employed. Other typical equivalent resins are Ionac C240, a polystyrene nuclear sulfonic acid resin by American Zeolite Corp., Duolite C20 and C25, polystyrene sulfonic acid resins by Chemical Process Co., Imac C12, a polystyrene nuclear sulfonic acid resin, and Imac C22, a sulfonated polystyrene resin, by Industrieele Maatschappij Activit N. V., Permutit Q, a polystyrene sulfonic acid resin by The Permutit Co., Zeocarb 225, a styrene base nuclear sulfonic resin by The Permutit Co., Ltd., Permutit C-50-D, a sulfonated polystyrene resin by Phillips et Pain-Vermorel, Amberlite CG-120, a polystyrene sulfonic acid resin, and Amberlite IR-120, a styrene base nuclear sulfonic acid resin, by Rohm & Haas, and other styrene base nuclear sulfonic acid resins such as Permutit R.S. by Permutit A.G., Wolfatite KPS 200 by VEB Farbenfabrik Wolfen, Montecatini C100 and C300, Cationi G-300, and Resina Cationica by Montecatini.

A modified version of the process illustrated schematically in FIGS. 1A and 1B involves recycling a portion of the elutant solution from the ion exchange resins in columns 16, 18 and 20 to reduce the amount of acid in tank 32 which must be directed through the still 56. One method involves recycling the last one-third of the elution effluent from the ion exchange resins with the recycle regenerant being returned to the tank 100 rather than being directed into tank 32. It can be recognized that this lowers the eluting ability of the solution in storage tank 100, but materially decreases the amount of steam which must be supplied to the still 56 in order to remove the required amount of acetone from the recovered acid. Tests have shown that the actual loss of monovalent cations in the suggested recycle operation approximates 5% of the total monovalent ions recovered, but with a corresponding 50% decrease in the amount of recovered acid which must be subjected to distillation in the still 56. Not only is there a reduction in the capital cost of the equipment by virtue of the utilization of a somewhat smaller still, but additional savings are effected from lowering of the amount of steam required as well as the equipment for producing such steam.

Potassium base spent sulfite liquor may be processed in substantially the same manner detailed above, but in the processing of soda base spent sulfite liquor, the composition should be loaded onto the resin bed at a somewhat slower rate than specified in the respresentative example, and the monovalent and multivalent cations should be eluted from the resin bed at a slightly faster rate. Tests have indicated that for soda base and using the equipment previously specified, the soda base spent liquor should be loaded on the resin at about 6.0 gallons/sq. ft./min. and the monovalent and multivalent cations eluted from the bed at about 5.1 gallons/sq. ft./min.

Having thus described the invention what is claimed as new and desired to be secured by Letters Patent is:

1. An ion exchange method of treating the spent sulfite liquor resulting from monovalent cation sulfite pulping of wood to recover monovalent cations from the liquor comprising the steps of:

passing the spent liquor through an ion exchange resin having hydrogen ions thereon to cause the hydrogen ions on the resin to be replaced by monovalent and multivalent cations from the spent liquor and producing a ligninsulfonic acid first effluent from the resin;

subsequently passing a sulfur dioxide regeneration solution through the resin and containing sulfurous acid and a sufficient quantity of a carbonyl compound selected from the group consisting of benzaldehyde, iso-butyraldehyde, cyclohexanone, furfuraldehyde, methyl ethyl ketone, methyl iso-butyl ketone, mesityl oxide, salicylaldehyde, formaldehyde, acetaldehyde and acetone for reaction with the sulfurous acid to form a water soluble sulfonic acid for increasing the hydrogen ion concentration of the solution to a level to effect displacement of monovalent and multivalent cations from the resin by hydrogen ions in the solution to thereby simultaneously regenerate the resin to hydrogen form and produce a second effluent from the resin and containing monovalent and multivalent cations therein;

treating said second effluent by raising the pH thereof to effect substantial separation of multivalent cations from the monovalent cations in the second effluent; and then substantially removing the carbonyl compound from said second effluent to produce a monovalent cation solution suitable for reuse in further monovalent cation pulping of wood.

2. A method as set forth in claim 1 wherein the sulfur dioxide content of the solution and the quantity of said compound therein are approximately 2.75 molar and 1.52 molar respectively.

3. A method as set forth in claim 1 wherein sufficient sulfur dioxide and said compound are present in the solution to cause the pH thereof to be approximately 0.0.

4. A method as set forth in claim 1 wherein the step of raising the pH of the second effluent includes removing sufficient sulfur dioxide from the second effluent to raise the pH thereof to approximately 3 to 4.

5. A method as set forth in claim 4 wherein there is included the step of raising the pH of the second effluent to at least 6 by addition of a basic substance thereto following removal of said sulfur dioxide from the second effluent.

6. A method as set forth in claim 1 wherein the step of substantially removing the carbonyl compound from said second effluent includes subjecting the second effluent to distillation for a sufficient period of time to substantially volatilize all of the carbonyl compound present in said second effluent.

7. A method as set forth in claim 1 wherein said solution contains from about 1% to approximately 26% by weight of said carbonyl compound.

8. A method as set forth in claim 1 wherein said solution contains from about 2.5% to approximately 25% by weight of sulfur dioxide.

9. A method as set forth in claim 1 wherein there is included the step of filtering the second effluent to remove the precipitant therefrom prior to removal of the carbonyl compound therefrom.

10. In an ion exchange method of treating the spent sulfite liquor resulting from monovalent cation sulfite pulping of wood to recover monovalent cations from the liquor and wherein a quantity of an ion exchange resin is loaded with monovalent and multivalent cations from the spent liquor, the improved step of simultaneously regenerating the resin to hydrogen form and producing an effluent from the resin containing monovalent and multivalent cations therein by passing a sulfur dioxide regeneration solution through the resin and containing sulfurous acid and a sufficient quantity of a carbonyl compound selected from the group consisting of benzaldehyde, isobutyraldehyde, cyclohexanone, furfuraldehyde, methyl ethyl ketone, methyl iso-butyl ketone, mesityl oxide, salicylaldehyde, formaldehyde, acetaldehyde and acetone for reaction with the sulfurous acid to form a water soluble sulfonic acid for increasing the hydrogen ion concentration of the solution to a level to effect displacement of monovalent and multivalent cations from the resin by hydrogen ions in the solution.

11. A method of treating an aqueous liquor containing monovalent and multivalent cations exchangeable for hydrogen ions on an ion exchange resin to separate the monovalent from the multivalent cations comprising the steps of:

passing the monovalent and multivalent cation liquor through an ion exchange resin having hydrogen ions thereon to cause the hydrogen ions on the resin to be replaced by monovalent and multivalent cations from said liquor and producing a first effluent from the resin;

discontinuing passage of said liquor through the resin after loading of monovalent and multivalent cations thereon exchanged for hydrogen ions;

then passing a sulfur dioxide regeneration solution through the resin and containing sulfurous acid and a sufficient quantity of a carbonyl compound selected from the group consisting of benzaldehyde, isobutyraldehyde, cyclohexanone, furfuraldehyde, methyl ethyl ketone, methyl iso-butyl ketone, mesityl oxide, salicylaldehyde, formaldehyde, acetaldehyde and acetone for reaction with the sulfurous acid to form a water soluble sulfonic acid for increasing the hydrogen ion concentration of the solution to a level to effect displacement of monovalent and multivalent cations from the resin by hydrogen ions in the solution to thereby simultaneously regenerate the resin to hydrogen form and produce a second effluent from the resin and containing monovalent and multivalent cations therein;

discontinuing passage of the regenerating solution through the resin for reloading of the same with monovalent and multivalent cations from said liquor;

treating said second effluent by raising the pH thereof to effect substantial precipitation and thereby separation of multivalent cations from the monovalent cations in the second effluent;

removing the precipitated multivalent cations from said second effluent; and then substantially removing the carbonyl compound from said second effluent to produce a monovalent cation solution.

References Cited by the Examiner

UNITED STATES PATENTS

| | | | |
|---|---|---|---|
| 841,999 | 1/1907 | Muller. | |
| 885,567 | 4/1908 | Becker. | |
| 909,703 | 1/1909 | Stock. | |
| 2,218,660 | 10/1940 | Schowalter et al. | 260—513 |
| 2,671,800 | 3/1954 | Copenhauer | 260—513 |
| 2,778,714 | 1/1957 | Kasper et al. | 162—36 |
| 2,792,350 | 5/1957 | Bradley et al. | 162—36 |
| 2,913,309 | 11/1959 | Sandborn et al. | 23—49 |
| 2,916,355 | 12/1959 | Swenson | 210—32 |
| 2,994,633 | 8/1961 | Clark | 162—16 |
| 3,027,226 | 3/1962 | Hossain | 162—36 |
| 3,057,770 | 10/1962 | Bjorkman | 162—36 |
| 3,095,265 | 6/1963 | Effer et al. | 23—49 |

FOREIGN PATENTS

| | | |
|---|---|---|
| 618,158 | 4/1961 | Canada. |

DONALL H. SYLVESTER, *Primary Examiner.*

MORRIS O. WOLK, WILLIAM B. KNIGHT,
*Examiners.*